(12) United States Patent
Li et al.

(10) Patent No.: US 10,838,225 B2
(45) Date of Patent: Nov. 17, 2020

(54) THREE-DIMENSIONAL DISPLAY DEVICE

(71) Applicant: BOE TECHNOLOGY GROUP CO., LTD., Beijing (CN)

(72) Inventors: Yanzhao Li, Beijing (CN); Hu Meng, Beijing (CN); Hui Tian, Beijing (CN); Long Wang, Beijing (CN); Chiachiang Lin, Beijing (CN); Chiehhsing Chung, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 93 days.

(21) Appl. No.: 15/529,528

(22) PCT Filed: Jun. 2, 2016

(86) PCT No.: PCT/CN2016/084493
§ 371 (c)(1),
(2) Date: May 25, 2017

(87) PCT Pub. No.: WO2017/152519
PCT Pub. Date: Sep. 14, 2017

(65) Prior Publication Data
US 2018/0081188 A1 Mar. 22, 2018

(30) Foreign Application Priority Data
Mar. 9, 2016 (CN) .......................... 2016 1 0131947

(51) Int. Cl.
*G02B 27/22* (2018.01)
*G02B 30/36* (2020.01)
*G02B 30/00* (2020.01)
(52) U.S. Cl.
CPC ............. *G02B 30/36* (2020.01); *G02B 30/00* (2020.01)

(58) Field of Classification Search
CPC ................ G02B 27/2242; G02B 27/22; G02B 27/2228; G02B 27/2271; G02B 30/36;
(Continued)

(56) References Cited

U.S. PATENT DOCUMENTS 5,239,414 A * 8/1993 Reno ....................... G02B 13/10
359/669
5,914,807 A 6/1999 Downing
(Continued)

FOREIGN PATENT DOCUMENTS

CN 1690693 A 11/2005
CN 101525540 A 9/2009
(Continued)

OTHER PUBLICATIONS

First Office Action from China Application No. 201610131947.5 dated Aug. 8, 2017.
(Continued)

*Primary Examiner* — Stephone B Allen
*Assistant Examiner* — Jyotsna V Dabbi
(74) *Attorney, Agent, or Firm* — Calfee, Halter & Griswold LLP

(57) ABSTRACT

A three-dimensional display device having an imaging space, wherein an up-conversion material is disposed inside the imaging space, a first light source that emits light toward the imaging space in a first direction, and a second light source that emits light toward the imaging space in a second direction. When the three-dimensional display device is operating, the light from the first light source and the light from the second light source intersect in the imaging space to form a convergence line or light convergence plane, such that the up-conversion material on the convergence line or in the convergence plane is excited to emit light.

9 Claims, 2 Drawing Sheets

(58) Field of Classification Search
CPC .. G02B 30/00; G02F 2/02; G02F 2/00; H04N 13/39; H04N 13/398; H04N 13/332; H04N 13/189; H04N 13/324; H04N 13/597; H04N 13/286; G11C 13/04
USPC .......................................................... 359/462
See application file for complete search history.

(56) References Cited

U.S. PATENT DOCUMENTS

| | | | | |
|---|---|---|---|---|
| 6,296,749 | B1* | 10/2001 | Balch | G01N 27/44721 204/450 |
| 2007/0247595 | A1* | 10/2007 | Refai | G03B 21/26 353/94 |
| 2008/0192314 | A1 | 8/2008 | Bates et al. | |
| 2014/0015867 | A1 | 1/2014 | Xin et al. | |
| 2015/0273624 | A1* | 10/2015 | Yoshida | C03C 27/00 428/209 |
| 2016/0166333 | A1* | 6/2016 | Wang | A61B 90/30 600/476 |

FOREIGN PATENT DOCUMENTS

| | | | |
|---|---|---|---|
| CN | 102645751 A | 8/2012 | |
| CN | 202771106 A | 3/2013 | |
| CN | 202771106 U | 3/2013 | |
| CN | 103885280 A | 6/2014 | |
| CN | 105572891 A | 5/2016 | |
| CN | 205450462 U | 8/2016 | |
| JP | 2007139928 A * | 6/2007 | ............. G02B 27/22 |
| JP | 2007139928 A | 6/2007 | |

OTHER PUBLICATIONS

Third Office Action for Chinese Patent Application No. 201610131947.5 dated Jun. 19, 2018.
Downing, Elizabeth, et al. "A Three-Color, Solid State, Three-Dimensional Display," Science, 1996, 273 (5279):1185-1189.
Second Office Action from China Application No. 201610131947.5 dated Jan. 23, 2017.
International Search Report for Chinese International Application No. PCT/CN2016/084493 dated Nov. 30, 2016.
Korevaar E, Hakakha H, "Three dimensional volumetric display in rubidium vapor" Proceedings of SPIE, San Jose, CA, USA, 1996 : 274-284.
Lewis J D, Verber C M, McGhee R B. "A true three-dimensional display" IEEE Transactions on Electron Devices, 1971, 18(9) : 724. 732.

* cited by examiner

THREE-DIMENSIONAL DISPLAY DEVICE

CROSS-REFERENCE TO RELATED APPLICATIONS

The present application is the U.S. national phase entry of PCT/CN2016/084493, with an international filling date of Jun. 2, 2016, which claims the benefit of Chinese Patent Application NO. 201610131947.5, filed on Mar. 9, 2016, the entire disclosure of which is incorporated herein by reference.

FIELD OF THE INVENTION

The present invention relates to the field of display technology, and particularly to a three-dimensional (3D) display device.

BACKGROUND

In order to provide a more lifelike visual perception for the user, people have been actively exploring the display technologies. Currently, three-dimensional display has already become an important development orientation of the field of display technology, and various 3D display technologies have been developed, such as parallax-type 3D display, holographic 3D display and rotary strafing display. However, parallax-type and holographic 3D displays are both confronted with the problems of limited visual angle and bad visual perception, and the method of rotary strafing may cause a potential safety danger due to the requirement for high speed rotation of the screen.

SUMMARY

The embodiments of the disclosure provide a three-dimensional display device different from the one in the prior art, to thereby improve the image quality for the three-dimensional display device.

According to the embodiments of the disclosure, the proposed three-dimensional display device comprises an imaging space, wherein an up-conversion material is disposed inside the imaging space, a first light source that emits light toward the imaging space in a first direction, and a second light source that emits light toward the imaging space in a second direction. During the operation of the three-dimensional display device, the light from the first light source and the light from the second light source intersect in the imaging space to form one of a convergence line and a light convergence plane, such that the up-conversion material on the convergence line or in the convergence plane is excited to emit light.

As for the three-dimensional display device provided in the embodiments of the present disclosure, the up-conversion material can be scanned by using dual light sources from different directions. That is, the image information and energy required for displaying come from different light sources. When the light from the information light source and the light from the energy light source intersect in the imaging space, the up-conversion material is excited to emit light so as to generate a pixel plane or a pixel line, to thereby produce a suspended three-dimensional display effect. Such suspended 3D display can also be referred to as volumetric three-dimensional display, in which the two light sources may cooperate with each other to achieve a linear or planar scanning for the up-conversion material in the imaging space, and the requirement for the scanning speed is not high, thereby facilitating improvement of the quality of the displayed image. Besides, the information light source and the energy light source are provided separately, so optimization of the entire structure of the three-dimensional display device becomes easier, which is beneficial to commercialization of the three-dimensional display device.

In certain exemplary embodiments, the three-dimensional display device may further comprise a first beam expanding component arranged in a first light path between the first light source and the imaging space for expanding the beam of light from the first light source to obtain a first parallel light beam which has a planar shape as a whole, and a second beam expanding component arranged in a second light path between the second light source and the imaging space for expanding the beam of light from the second light source to obtain a second light beam which has a columnar shape as a whole. The first parallel light beam and the second light beam intersect in the imaging space to form a light convergence plane.

In certain exemplary embodiments, in another embodiment, the three-dimensional display device may further comprise a first beam expanding component arranged in a first light path between the first light source and the imaging space for expanding the beam of light from the first light source to obtain a first parallel light beam which has a planar shape as a whole, and a third beam expanding component arranged in a second light path between the second light source and the imaging space for expanding the beam of light from the second light source to obtain a second parallel light beam which has a planar shape as a whole. The first parallel light beam and the second light beam intersect in the imaging space to form a light convergence line.

In certain exemplary embodiments, the first beam expanding component may comprise a first spherical prism and a second spherical prism, and the focuses of the first spherical prism and the second spherical prism coincide with each other on the first light path. The second beam expanding component may comprise a third spherical prism and a cylindrical prism, and the cylindrical prism is located downstream of the third spherical prism on the second light path.

In certain exemplary embodiments, the first beam expanding component may comprise a first spherical prism and a second spherical prism, and the focuses of the first spherical prism and the second spherical prism coincide with each other on the first light path. The third beam expanding component may comprise a third spherical prism and a fourth spherical prism, and the focuses of the third spherical prism and the fourth spherical prism coincide with each other on the second light path.

In certain exemplary embodiments, the three-dimensional display device may further comprise a focusing prism located downstream of the second beam expanding component in the second light path.

According to a further embodiment of the present disclosure, the three-dimensional display device may further comprise a sync generator for synchronizing a frequency of the light pulse emitted from the first light source with a frequency of the light pulse emitted from the second light source.

According to certain exemplary embodiments of the disclosure, the three-dimensional display device may further comprise an electrical apparatus coupled to the first light source, which electrical apparatus is configured to move the first light source in a direction perpendicular to the plane of the first parallel light beam while the three-dimensional display device is operating. As such, the first light source may achieve scanning for the up-conversion material in the imaging space at a certain frequency.

As to the three-dimensional display device provided in the embodiments of the present disclosure, the up-conversion material in the imaging space may comprise at least one selected from a group consisting of sulfur compound, fluoride and chloride, as well as a corresponding excitation ion.

According to certain exemplary embodiments of the present disclosure, the first light source can emit infrared light or ultraviolet light, the second light source can emit infrared light, and the infrared light emitted from the second light source is carried with the image information of the image to be displayed.

In certain exemplary embodiments, the up-conversion material comprises calcium sulphide doped with samarium ions. Calcium sulphide doped with samarium ions may be represented as CaS:Sm, which may emit a light with the wavelength of 567 nanometers under laser excitation. In this case, the three-dimensional display device may present a yellow display effect.

In certain exemplary embodiments, the first light source may comprise three sub light sources that emit infrared lights with the same wavelength, and the second light source may comprise three sub light sources that emit infrared lights with different wavelengths. The lights with different wavelengths emitted by the sub light sources in the second light source may be used as the information carrier wave corresponding to different colors, to thereby achieve a colored display effect.

In certain exemplary embodiments, the three sub light sources in the second light source emit infrared lights respectively with the wavelengths of 1014 nanometers, 1500 nanometers and 1120 nanometers, and the three sub light sources in the first light source emit infrared lights with the wavelength of 980 nanometers.

In certain exemplary embodiments, the up-conversion material comprises fluoride glass doped with praseodymium ions, fluoride glass doped with erbium ions and fluoride glass doped with thulium ions.

According to a further embodiment of the present disclosure, one of the top and sidewalls of the imaging space of the three-dimensional display device comprises a light absorbing material.

BRIEF DESCRIPTION OF THE DRAWINGS

Embodiments of the disclosure will be described below in more details with reference to the accompanying drawings by way of non-limiting examples, so as to provide a thorough understanding of the principle and spirit of the disclosure. It is to be noted that the features and structures shown in the drawings do not necessarily represent the actual shapes and dimensions of the corresponding components and elements, but are merely used to illustrate the principles of embodiments of the present disclosure.

DETAILED DESCRIPTION OF EMBODIMENTS

Figure 1:
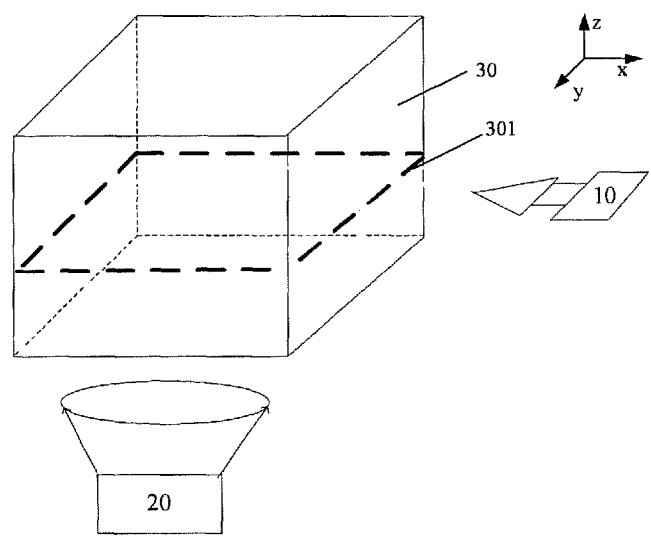
FIG. 1 illustrates a structural view of the three-dimensional display device according to an embodiment of the present disclosure.

Specific embodiments of the disclosure will be described below in detail by way of examples. It is to be understood that embodiments of the invention are not limited to the examples set forth below, and that those skilled in the art can make modifications and variations to the described embodiments using the principle or spirit revealed in the present disclosure to obtain other different embodiments. Apparently, these embodiments all fall within the protection scope of the invention.

In addition, it is to be noted that the accompanying drawings are for the purpose of illustrating and explaining the embodiments of the present disclosure. The shape, dimension of each component and connections between different components as embodied in the drawings are merely used to illustrate the embodiments of the present disclosure and should not be construed as limiting the scope of the invention.

The three-dimensional display device provided in the embodiments of the disclosure belongs to a suspended 3D display device, which comprises an imaging space and two light sources. An up-conversion material is disposed inside the imaging space. One of the two light sources may be used as an energy light source capable of providing the energy required by the three-dimensional display device, and the other may be used as an information light source capable of emitting a light beam carried with the information of the content to be displayed. In operation of the three-dimensional display device, the light from the energy light source and the light from the information light source intersect in the imaging space to form a light convergence line or light convergence plane, such that the up-conversion material on the convergence line or in the convergence plane is excited to emit light, to thereby form a pixel line or a pixel plane.

FIG. 1 schematically shows a structural view of the three-dimensional display device according to an embodiment of the disclosure. As shown in FIG. 1, in this embodiment, the three-dimensional display device may comprise an imaging space 30, inside which an up-conversion material is disposed; a first light source 10 that emits light toward the imaging space 30 in a first direction; and a second light source 20 that emits light toward the imaging space 30 in a second direction. During the operation of the three-dimensional display device, the light from the first light source 10 and the light from the second light source 20 intersect in the imaging space 30 to form a light convergence plane, such that the up-conversion material in the convergence plane is excited to emit light. In FIG. 1, the light convergence plane is indicated by plane 301 enclosed by a thick dash line in FIG. 1.

In the embodiment shown by FIG. 1, a parallel light beam emitted from the right side of the imaging space 30 toward the imaging space 30 may be obtained from the first light source 10, and this parallel light beam when passing through the imaging space 30 may intersect with the imaging space 30 to form a plane 301. A three-dimensional light beam emitted below the imaging space 30 toward the imaging space 30 may be obtained from the second light source 20. The three-dimensional light beam may intersect with the parallel light beam from the first light source 10 so as to at least cover a portion of the plane 301. The first light source 10 may serve as the energy light source, and the second light source 20 may serve as the information light source, i.e., the light beam emitted therein may carry the information of the content to be displayed. When the three-dimensional display device operates, the parallel light beam obtained from the first light source 10 and the three-dimensional light beam obtained from the second light source 20 may intersect in the imaging space 30 to form a light convergence plane, and the plane where the convergence plane is located is just the plane 301 shown by the dash line in FIG. 1. Accordingly, the up-conversion material in the convergence plane can be excited to emit light, and the convergence plane may be deemed as the pixel plane of the three-dimensional display device.

In the embodiments, the first light source 10 and the second light source 20 may be laser light sources that emit laser pulses with a certain frequency. The first light source 10 may scan the up-conversion material in the imaging space 30 in a certain direction. A suspended three-dimensional display effect can be created when the first light source 10 and the second light source 20 scan the up-conversion material in the imaging space 30 synchronously. The pixel resolution of the pixel plane 301 may be set as required, for example, in the embodiment shown in FIG. 1, the resolution of the pixel plane 301 may be 1024 (x direction)×768 (y direction). The first light source 10 may scan the up-conversion material in the imaging space 30 from bottom to top or from top to bottom, and the frequency of scanning determines the pixel resolution in z direction. For example, if the first light source 10 finishes scanning for 768 pixel planes in z direction within 1/60 second, 768 pixel resolution in z direction is achieved. Accordingly, the voxel resolution for the three-dimensional display device is 1024 (x direction)×768 (y direction)×768 (z direction). Regarding this embodiment, during the operation of the three-dimensional display device, the parallel light beam from the first light source 10 and the three-dimensional light beam from the second light source 20 intersect in the imaging space 30 to form a light convergence plane 301, so in this case the manner for scanning the up-conversion material in the imaging space 30 may be referred to as planar scanning. In this embodiment, the propagation direction of the three-dimensional light beam from the second light source 20 may be perpendicular to the propagation direction of the parallel light beam from the first light source 10. In certain exemplary embodiments, in other embodiments, the propagation direction of the three-dimensional light beam from the second light source 20 may intersect with the propagation direction of the parallel light beam from the first light source 10 to form any suitable intersection angle.

Generally speaking, the up-conversion material refers to luminescent materials capable of emitting visible light by excitation of an external light source, which is characterized in that the photon energy absorbed is lower than the photon energy emitted. As this phenomenon goes against the Stokes law, the up-conversion material may also be called as anti-Stokes law luminescent materials. In the embodiments of the present disclosure, the up-conversion material is excited by dual photons, i.e., two beams of light with different wavelengths irradiate onto such an up-conversion material, which can be excited to emit visible light by absorbing these two beams of light simultaneously. For example, the ground state electron may transition to an intermediate state by absorbing the photon with a first wavelength from the first light source, and can transition to an excitation state by absorbing the photon with a second wavelength from the second light source at the same time, visible light photons can be radiated when deexcitation from the excitation state occurs.

The up-conversion material may comprise a main material and corresponding excitation ions. For example, the main materials include, but are not limited to, such fluoride as barium fluoride or strontium fluoride, and the excitation ions may be non-rare earth ions or rare earth ions such as $N_d^{3+}$, $T_m^{3+}$, $E_r^{3+}$, etc. The main material may also be oxide, sulfur compound, fluoride, halide, etc. In certain exemplary embodiments, in other embodiments, an organic up-conversion material may also be used. These up-conversion materials may emit light by irradiation of an external light source. The principle or process of the up-conversion material emitting light by excitation of the external light is already known in the art, which will not be described in detail herein.

Figure 2:
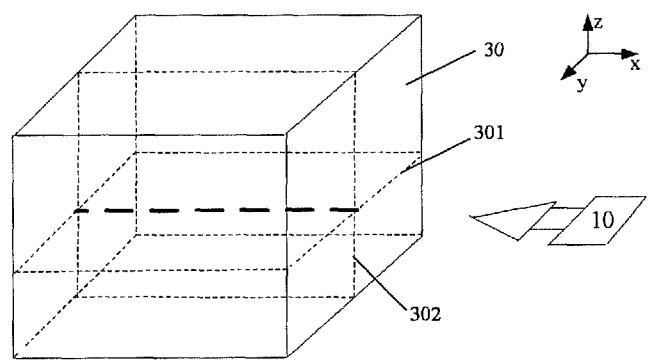
FIG. 2 illustrates a structural view of the three-dimensional display device according to another embodiment of the present disclosure.
Figure 2:
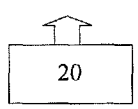

FIG. 2 illustrates a three-dimensional display device according to another embodiment of the present disclosure. The three-dimensional display device has a similar structure to that in the embodiment shown by FIG. 1, with the difference in that the light beams from the first light source 10 and the second light source 20, and incident into the imaging space 30 are both parallel light beams. As shown in FIG. 2, when the parallel light beam from the first light source 10 passes through the imaging space 30, this parallel light beam may intersect therewith to form a plane 301 (as shown by the dash line in FIG. 1). When the parallel light beam from the second light source 20 passes through the imaging space 30, the parallel light beam may intersect therewith to form a plane 302 (as shown by the dash line in FIG. 1). Therefore, in operation of the three-dimensional display device, the light from the first light source 10 and the light from the second light source 20 intersect in the imaging space 30 to form a light convergence line, such that the up-conversion material on the convergence line can be excited to emit light. In FIG. 2, the light convergence line is indicated with the thick dash line in FIG. 2, i.e., the intersection line of the plane 301 and the plane 302. In this embodiment, the propagation direction of the parallel light beam from the second light source 20 may be perpendicular to the propagation direction of the parallel light beam from the first light source 10. In certain exemplary embodiments, in other embodiments, the propagation direction of the parallel light beam from the second light source 20 may intersect with the propagation direction of the parallel light beam from the first light source 10 to form any suitable intersection angle. Regarding these embodiments, since when the three-dimensional display device is operating, the parallel light beam from the first light source 10 and the parallel light beam from the second light source 20 may intersect in the imaging space 30 to form a light convergence line, so the manner for scanning the up-conversion material in the imaging space 30 may be called as linear scanning.

For the conventional suspended 3D display technology, it relates to single pixel point scanning, i.e., the up-conversion material in the imaging space is scanned point by point. This results in that a fast scanning speed is required, so the image quality is affected, and a potential safety danger may also exist because the energy of the required light source is rather great. As regards the three-dimensional display device provided in the embodiments of the present disclosure, the up-conversion material is scanned by dual light sources from different directions, the image information and energy required for displaying come from different light sources. When the light from the information light source and the light from the energy light source intersect in the imaging space, the up-conversion material is excited to emit light, so as to form a pixel plane or a pixel line, thereby producing a suspended three-dimensional display effect. The three-dimensional display device may significantly reduce the high scanning speed required by the conventional scanning point by point, to thereby improve the quality of the displayed image. Besides, the information light source and the energy light source are provided separately, so optimization of the entire structure of the three-dimensional display device becomes easier, which is also beneficial to commercialization of the three-dimensional display device.

Figure 3:
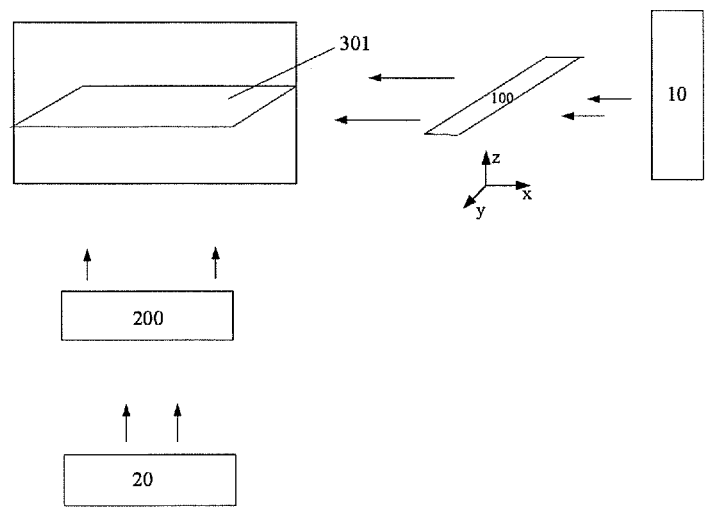
FIG. 3 illustrates a structural view of the three-dimensional display device according to a further embodiment of the present disclosure.

According to an embodiment of the disclosure, the three-dimensional display device may further comprise a first beam expanding component arranged in a first light path between the first light source and the imaging space for expanding the beam of light from the first light source to obtain a first parallel light beam which has a planar shape as a whole, and a second beam expanding component arranged in a second light path between the second light source and the imaging space for expanding the beam of light from the second light source to obtain a second light beam which has a columnar shape as a whole. The first parallel light beam and the second light beam intersect in the imaging space to form a light convergence plane. FIG. 3 schematically shows the structure of the three-dimensional display device according to this embodiment. As shown in FIG. 3, the first beam expanding component 100 is arranged in the first light path between the first light source 10 and the imaging space, which is capable of expanding the beam of light from the first light source 10 in a single direction (e.g., y direction in the embodiment shown in FIG. 3) to obtain a wider first parallel light beam, the first parallel light beam having a planar shape on the xy plane. The second beam expanding component 200 is arranged in the second light path between the second light source 20 and the imaging space for expanding the beam of light from the second light source 20 to obtain a second light beam with a greater radiation range (e.g., the three-dimensional light beam in z direction in the embodiment shown by FIG. 3), the second light beam having a columnar shape as a whole. The first parallel light beam and the second light beam intersect in the imaging space to form a light convergence plane 301. Therefore, the up-conversion material in the convergence plane 301 can be excited to emit light, and a 3D display effect can be produced when the first light source 10 scans the imaging space from top to bottom or from bottom to top in z direction.

In certain exemplary embodiments, according to another embodiment of the disclosure, the three-dimensional display device may comprise a first beam expanding component arranged in a first light path between the first light source and the imaging space for expanding the beam of light from the first light source to obtain a first parallel light beam which has a planar shape as a whole, and a third beam expanding component arranged in a light path between the second light source and the imaging space for expanding the beam of light from the second light source to obtain a second parallel light beam which has a planar shape as a whole. The first parallel light beam and the second light beam intersect in the imaging space to form a light convergence line. That is to say, in this embodiment, each of the first beam expanding component and the third beam expanding component performs beam expanding in a single direction for respective light source, obtaining the first parallel light beam and the second parallel light beam that intersect with each other in the imaging space to form a light convergence line, thereby achieving linear scanning as mentioned in the preceding embodiments.

In the embodiment shown by FIG. 3, although the first beam expanding component 100 and the second beam expanding component 200 are shown respectively to be located outside of the first light source 10 and the second light source 20, the first beam expanding component 100 may be fixedly coupled to the first light source 10, and the second beam expanding component 200 may be fixedly coupled to the second light source 20. In other words, the first beam expanding component 100 and the second beam expanding component 200 may be deemed as constituent parts of the first light source 10 and the second light source 20, respectively.

Figure 4:
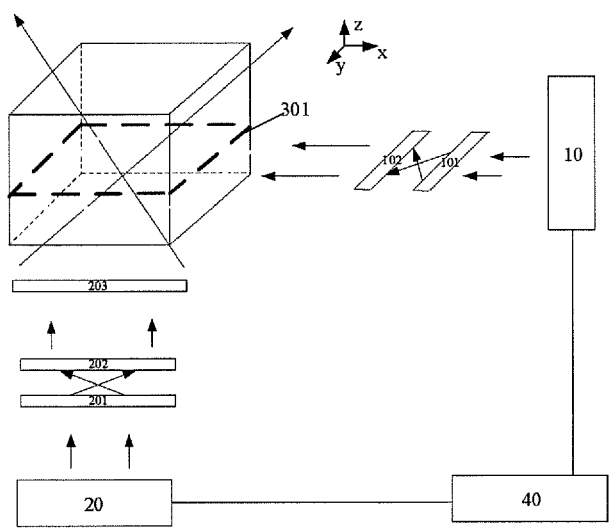
FIG. 4 illustrates a structural view of the three-dimensional display device according to yet another embodiment of the present disclosure.

In order to set forth the embodiments of the disclosure more clearly, the first beam expanding component and the second beam expanding component will be explained in details by way of examples below. FIG. 4 illustrates the three-dimensional display device according to an embodiment of the disclosure, which schematically shows light paths from the first light source and second light source to the imaging space. As shown in FIG. 4, the first beam expanding component in the light path from the first light source 10 to the imaging space may comprise a first spherical prism 101 and a second spherical prism 102, and the focuses of the first spherical prism 101 and the second spherical prism 102 coincide with each other on the first light path. The second beam expanding component comprises a third spherical prism 201 and a cylindrical prism 202, and the cylindrical prism 202 is located downstream of the third spherical prism 201 in the second light path. As mentioned above, the first light source 10 and the second light source 20 may be laser light sources, the light emitted from which may be approximately parallel light beams with a narrower width and good collimation. The narrower parallel light beams emitted from the first light source 10 converge after passing through the first spherical prism 101 and are focused on the focus thereof. Since the focus of the second spherical prism 102 coincides with the focus of the first spherical prism 101, the light beam is converted into a wider parallel light beam after passing through the second spherical prism 102. In fact, this parallel light beam has a certain thickness, which is substantially the same as the thickness of the light beam directly emitted from the first light source 10. If this thickness is unconsidered, it may be deemed that this parallel light beam is a two-dimensional light beam on the xy plane. The light emitted from the second light source 20, after passing through the third spherical prism 201 and the cylindrical prism 202, may become a magnified second light beam which has a columnar shape as a whole. The second light beam exits from the cylindrical prism 202, the cylindrical prism 202 at this time may be deemed as an area light source. As shown in FIG. 4, the second light beam may radiate a large range of the imaging space and intersect with the first parallel light beam from the first light source 10 in the imaging space to form a light convergence plane 301.

In certain exemplary embodiments, in another embodiment, the first beam expanding component may comprise a first spherical prism and a second spherical prism, and the focuses of the first spherical prism and the second spherical prism coincide with each other on the first light path. The third beam expanding component may comprise a third spherical prism and a fourth spherical prism, and the focuses of the third spherical prism and the fourth spherical prism coincide with each other on the second light path. As such, the first parallel light beam and the second parallel light beam as mentioned above can be obtained respectively, thus achieving linear scanning.

According to a further embodiment of the present disclosure, the three-dimensional display device may further comprise a focusing prism located downstream of the second beam expanding component on the second light path, for projecting the light from the second beam expanding component to the up-conversion material in the imaging space. As shown in FIG. 4, for example, the focusing prism 203 is arranged in downstream of the optical path between the second light source 20 and the imaging space, for projecting the light from the second beam expanding component to the up-conversion material in the imaging space, such that the lights carrying the image information are formed as image points that can be perceived by human eyes.

It can be understood that the beam expanding components applicable to the present invention are not limited to the above examples described with reference to FIG. 4, those skilled in the art can use any suitable optical device or combination of different optical devices based on optical theories to achieve the same function as that of the first beam expanding component, the second beam expanding component or the third beam expanding component. Other possible embodiments of these beam expanding components also belong to the scope the invention.

Further, the three-dimensional display device provided in the embodiments of the present disclosure may further comprise a sync generator for synchronizing the frequency of the light pulse emitted from the first light source with the frequency of the light pulse emitted from the second light source. Further referring to FIG. 4, the sync generator 40 may be electrically connected to the first light source 10 and the second light source 20, which is capable of coordinating the frequency of the light pulse emitted by the first light source 10 and the frequency of the light pulse emitted by the second light source 20 to bring them into consistency. In addition, the sync generator 40 may also adjust the frequency of light pulse emitted from the first light source 10 and the second light source 20, for example, to make the frequency of the light pulse vary between 30 Hz and 120 Hz based on the demand for the displaying effect.

According to an embodiment of the disclosure, the three-dimensional display device may further comprise an electrical apparatus coupled to the first light source, which electrical apparatus is configured to move the first light source in a direction perpendicular to the plane of the first parallel light beam during the operation of the three-dimensional display device. As regards the embodiment shown by FIG. 4, for example, by such an electrical apparatus, the first light source 10 in FIG. 4 may be moved at a certain frequency in z direction, to thereby achieve scanning for the up-conversion material in the imaging space in z direction. Such an electrical apparatus includes, but is not limited to a servo motor, a micro electro mechanical system (MEMS).

As stated above, any suitable up-conversion material may be disposed in the imaging space of the three-dimensional display device, for example, such an up-conversion material may comprise at least one selected from the group consisting of sulfur compound, fluoride and chloride, as well as a corresponding excitation ion.

In certain exemplary embodiments, the first light source emits infrared light or ultraviolet light, the second light source can emit infrared light. The infrared light emitted from the second light source is carried with the image information of the image to be displayed, i.e., the second light source may be used as the information light source. In this embodiment, the up-conversion material may be CaS:Sm (calcium sulphide doped with samarium ion) with a light emission wavelength of 567 nanometers, that is, its main material is calcium sulphide (CaS), and the doped ion is samarium (Sm) ion. The second light source may emit infrared light of 980 nanometers as the information carrier wave, and the first light source may emit infrared light of 980 nanometers as the energy light source. Since the light emission wavelength of CaS:Sm in the up-conversion material is 567 nanometers, a three-dimensional display effect in yellow may be achieved in the imaging space. Therefore, display effects in different colors may be achieved by disposing different up-conversion material in the imaging space.

In another embodiment, the first light source comprises three sub light sources that emit infrared lights with the same wavelength, and the second light source may comprise three sub light sources that emit infrared lights with different wavelengths. For example, the first light source may comprise three sub light sources that emit infrared lights with a wavelength of 980 nanometers, with the three sub light sources being stacked together or spaced from one another at a tiny distance. The second light source may comprise three sub light sources that emit infrared lights respectively with the wavelengths of 1014 nanometers, 1500 nanometers and 1120 nanometers, the three infrared lights emitted from the second source may be used as the information carrier wave corresponding to such three colors as red, green and blue, respectively. Correspondingly, the up-conversion material in the imaging space may comprise fluoride glass doped with praseodymium ions (ZBLAN:Pr), fluoride glass doped with erbium ions (ZBLAN:Er) and fluoride glass doped with thulium ions (ZBLAN:Tm). The above three up-conversion materials can be excited to emit red, green and blue lights, respectively, so the mixed up-conversion material including these three materials may emit lights in red, green and blue in the pixel plane. Therefore, in this embodiment, a colored three-dimensional display effect may be achieved.

In another embodiment of the present disclosure, the top or sidewall of the imaging space may comprise a light absorbing material, which includes, but not limited to, a thick metallic plate, a thick polycrystalline silicon film and a thick black ceramic, etc. Arranging the light absorbing material on the periphery of the imaging space can prevent light leakage in the imaging space to increase utilization efficiency of the light.

While embodiments of the disclosure have been described in detail with reference to the accompanying drawings, it is to be noted that the above embodiments are illustrative but not limiting the invention. Moreover, those skilled in the art can obtain many alternative embodiments without departing from the scope of the appended claims. For example, although it is mentioned in the preceding embodiments that the voxel resolution of the three-dimensional display device may be 1024 (x direction)×768 (y direction)×768 (z direction), a three-dimensional display device having other different voxel resolutions may also be achieved. In the claims, the word "comprise" or "comprising" does not exclude other elements or steps than those stated in the claims, and the indefinite article "a" or "an" preceding an element does not exclude a plurality. The mere fact that certain measures are recited in mutually different dependent claims does not indicate that a combination of these measures cannot be used to advantage.

The invention claimed is:

1. A three-dimensional display device, comprising:
an imaging space, wherein an up-conversion material is disposed inside the imaging space, a first light source that emits light toward the imaging space in a first direction, a second light source that emits light toward the imaging space in a second direction, wherein during an operation of the three-dimensional display device, the light from the first light source and the light from the second light source intersect in the imaging space to form a light convergence line, such that the up-conversion material on the convergence line is excited to emit light, wherein the three-dimensional display device further comprises:

a first beam expanding component arranged in a first light path between the first light source and the imaging space for expanding a beam of light from the first light source to obtain a first parallel light beam which has a planar shape as a whole, and a third beam expanding component arranged in a second light path between the second light source and the imaging space for expanding a beam of light from the second light source to obtain a second parallel light beam which has a planar shape as a whole, wherein the first parallel light beam and the second parallel light beam intersect in the imaging space to form the light convergence line, wherein the three-dimensional display device further comprises an electrical apparatus coupled to the first light source, which is configured to move the first light source in a direction perpendicular to a plane of the first parallel light beam when the three-dimensional display device is operating, wherein the first beam expanding component comprises a first spherical prism and a second spherical prism, and focuses of the first spherical prism and the second spherical prism coincide with each other on the first light path, wherein the third beam expanding component comprises a third spherical prism and a fourth spherical prism, and focuses of the third spherical prism and the fourth spherical prism coincide with each other on the second light path.

2. The three-dimensional display device according to claim 1, wherein the three-dimensional display device further comprises a sync generator for synchronizing a frequency of light pulse emitted from the first light source with a frequency of light pulse emitted from the second light source.

3. The three-dimensional display device according to claim 2, wherein the up-conversion material comprises at least one selected from a group consisting of sulfur compound, fluoride and chloride, as well as a corresponding excitation ion.

4. The three-dimensional display device according to claim 3, wherein the first light source is capable of emitting infrared light or ultraviolet light, the second light source is capable of emitting infrared light, and the infrared light emitted from the second light source is carried with image information of an image to be displayed.

5. The three-dimensional display device according to claim 4, wherein the up-conversion material comprises calcium sulphide doped with samarium ions.

6. The three-dimensional display device according to claim 4, wherein the first light source comprises three sub light sources that emit infrared lights with same wavelength, and the second light source comprises three sub light sources that emit infrared lights with different wavelengths.

7. The three-dimensional display device according to claim 6, wherein the three sub light sources in the second light source emit infrared lights respectively with wavelengths of 1014 nanometers, 1500 nanometers and 1120 nanometers, and the three sub light sources in the first light source emit infrared lights with a wavelength of 980 nanometers.

8. The three-dimensional display device according to claim 7, wherein the up-conversion material comprises fluoride glass doped with praseodymium ions, fluoride glass doped with erbium ions and fluoride glass doped with thulium ions.

9. The three-dimensional display device according to claim 1, wherein one of a top and a sidewall of the imaging space comprises a light absorbing material.

* * * * *